July 22, 1924.

E. C. POULTNEY 1,502,211

FLUID PRESSURE BRAKING APPARATUS

Filed Dec. 28, 1921    2 Sheets-Sheet 2

INVENTOR:
EDWARD CECIL POULTNEY
BY: Francis E. Boyce
ATTORNEY

Patented July 22, 1924.

1,502,211

UNITED STATES PATENT OFFICE.

EDWARD CECIL POULTNEY, OF LLANDUDNO, WALES.

FLUID-PRESSURE BRAKING APPARATUS.

Application filed December 28, 1921. Serial No. 525,405.

*To all whom it may concern:*

Be it known that I, EDWARD CECIL POULTNEY, of Mornington, Great Ormes Road, Llandudno, in the county of Carnarvon, Wales, a subject of the King of Great Britain and Ireland, have invented certain new and useful Improvements in or Relating to Fluid-Pressure Braking Apparatus, of which the following is a specification.

This invention relates to fluid pressure brakes, more particularly to compressed air or to vacuum brakes for use on a train of vehicles.

Hitherto in stopping a train the difference of fluid pressure has been applied equally to the whole surface or surfaces of the piston actuating the brake shoes, resulting in an equal braking force being applied to each truck. With goods trains made up of both loaded and empty trucks this is undesirable, for when the maximum braking pressure suitable for the loaded trucks is applied the wheels of the empty trucks are liable to be locked so that they slide along the rails and wear flats in the tyres, and if a loaded wagon is braked only with sufficient power as is necessary when such wagon is unloaded then the brake power is not sufficient for effective braking.

The object of the present invention is to obviate this defect, and to this end the invention consists in the provision of means whereby the brake shall when applied, operate upon each or any truck or the like either with the full braking power available, or with a portion only of such braking power, according as may have been previously determined for each truck or any truck.

The invention further consists in the means and apparatus hereinafter described for attaining this result.

According to this invention each truck or the like is provided with a device such that if previously set in a certain position any subsequent application of the brake will result in the full braking power being applied to the truck or the like in question, while if set in one of two or more other positions such application will result in a fraction only of such braking power being applied to such truck or the like.

In one method of carrying out the invention I provide a differential piston working in a brake cylinder and a suitably ported valve which may be operated at will, and connected with the brake cylinder on each or any one vehicle, so that the operating handle in one position will cause the brake piston to be placed in a state of partial balance when brake application is made whereby the resulting pressure tending to apply the brakes is less by a definite proportion than the maximum pressure available for any given train pipe pressure conditions, and with the operating handle in another position the brake piston will be put entirely out of balance when brake application is made, whereby the resulting pressure tending to apply the brakes is the maximum pressure available with the degree of train pipe pressure obtaining acting on the largest piston area.

The braking apparatus is adapted to be applied to each one of a train of vehicles such for example a railway goods train and in one form comprises a cylinder on each vehicle disposed within a vacuum chamber, a differential piston disposed and working in the cylinder and connected to a brake shoe, said piston having an annular and a smaller or trunk face on the one side, the sum of these faces being equal in area to the working face on the other side, which working face is always open to the train pipe.

The cylinder may be conveniently of the same type as that generally in use and the piston may be formed with a trunk or extension on one face (preferably the upper face) concentric thereto and preferably in the form of a hollow cylinder, having its cross sectional area equal to a certain proportion of the area of the main piston. This trunk portion projects through and is a working and reasonably air tight fit in a cover or diaphragm fitted to the top of the working cylinder which separates said cylinder from the vacuum reservoir.

The usual form or type of ball and release valves may be fitted to the cylinder in the ordinary way.

Suitable connections are made between the cylinder and a suitably ported operating valve. When the said valve is set in one position the annular face of the piston and the trunk face are placed in communication with the vacuum reservoir, the working face of the piston being in communication with the train pipe, then the air which is admitted to the train pipe acts solely on the working face resulting in the brakes being applied with the maximum brake effect for the given train pipe pressure conditions available.

When the said valve is set in another position the trunk face only is placed in communication with the vacuum reservoir whilst the annular face and the working face are connected to each other either by a connection to the cylinder or through a connection to the train pipe and both are placed in communication with the train pipe whereby the air when admitted to the train pipe acts on both the said annular face and the said working face resulting in the brakes being applied with a force proportional to the air pressure in the train pipe acting on a piston whose area is equal to the difference in the areas of the annular face and the working face of the brake piston or in other words, equal in area to the trunk face of the piston thereby applying a determined portion only of the maximum braking power available.

The operating valve may be of any suitable design or type. It is preferably three ported, giving simultaneous connection between the annular and working faces of the brake piston and the train pipe, and cutting off connection between the annular face of the piston and the reservoir. With the valve in such a position the operating handle would be in the position for partially braking the vehicle when unloaded.

For conditions of maximum braking, the valve would simultaneously close connection between the train pipe and the annular face of the piston, and connect the space between the annular face of the piston and cylinder cover with the reservoir. With the valve in such a position reservoir vacuum conditions are communicated to the annular face of the piston and as the trunk face is also subject to the same vacuum conditions full braking power is available for any degree of air pressure in the train pipe.

The operating valve may be worked by suitable handles mounted on spindles connected to the valve, the arrangement being preferably such that a handle may be placed on each side of the vehicle within easy reach. The handles may work in suitable segments fixed to the sole bars.

The piston may work vertically, or in the horizontal position.

The cylinder may be of the type having the reservoir surrounding the working barrel, or it may be of the kind having a separate reservoir or any other convenient form.

Any number of cylinders on any given vehicle may be used.

For two cylinders either two operating valves may be used or one valve with connection from each cylinder.

If two operating valves are used they may be coupled together so as to operate at the same time.

In some cases I may inversely dispose the differential brake piston in such a manner that the face of the trunk extension becomes the lower or working face, always in communication with the train pipe, the annular face becoming the lower face and the working face becoming the upper face always in communication with the vacuum reservoir. For conditions of maximum braking power according to this form, the working face and the annular face would both be placed in communication with the train pipe whilst the upper face would be in communication with the vacuum reservoir resulting in the brakes being applied with maximum brake effect for the given train pipe conditions acting on the whole area of the under sides of the piston. For conditions of partial braking power, the working face only would be in communication with the train pipe whilst the annular face and the upper face would both be in communication with the vacuum, resulting in the brakes being applied with a force proportional to the air pressure in the train pipe acting on a piston whose area is less by a definite amount than the maximum area, thereby applying a determined fraction only of the maximum braking power available.

In an alternative form of brake made for carrying out this invention a double headed piston may be provided the surfaces of one head being equal in area to the surfaces of the other head and each head being disposed in the same cylinder but separated from each other by a diaphragm. With this form of brake three different braking powers may be obtained, namely, maximum, intermediate and minimum.

In a further alternative form two pistons of different sizes mounted on one common rod may be provided, the pistons being disposed in one cylinder and separated from each other by a diaphragm. With this form of brake maximum, intermediate and minimum braking powers are also obtainable. Further the two pistons may be of the same size in which case the intermediate braking power would be dispensed with. The arrangement above described may be modified by dispensing with the internal cover or diaphragm, in which case I may obtain two different brake powers proportional to the areas of the large and small pistons, the manner of working being substantially the same as in the first methods described according as to whether the smallest or largest piston is uppermost.

In yet a further alternative form of brake, two separate pistons may be provided either of equal or unequal diameters, each being disposed in a cylinder, said cylinders being placed side by side with their axes parallel, in which form, maximum, intermediate and minimum braking powers are obtainable.

Referring to the drawings filed herewith,

Figure 1:
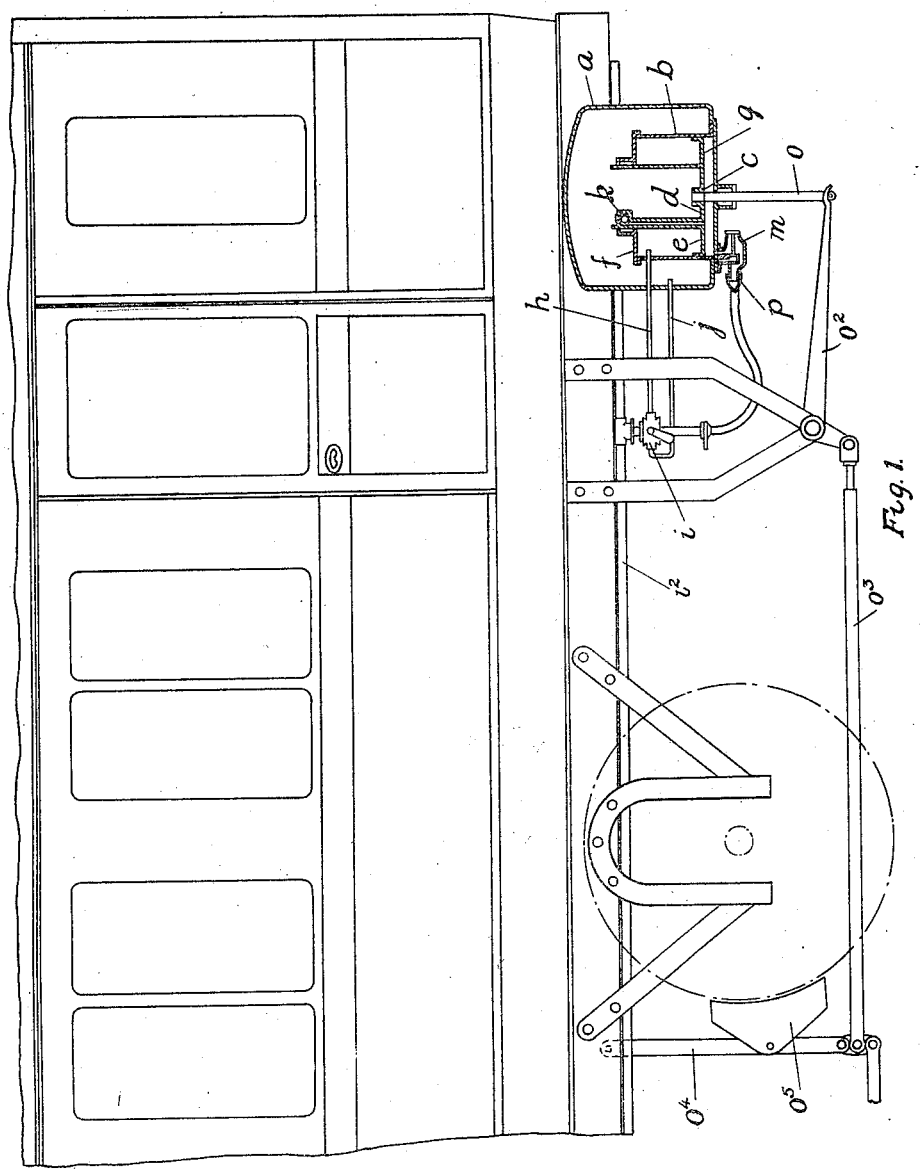
Fig. 1 is a sectional elevation of one form of vacuum brake made in accordance with this invention showing its application to a railway vehicle.
Figure 2:
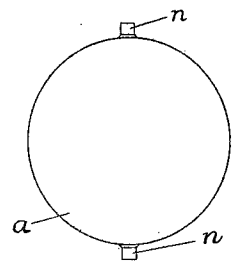
Fig. 2 is a diagrammatic plan of the brake cylinder and reservoir.

In Fig. 1, $a$ is a vacuum reservoir, $b$ the cylinder and $c$ the differential piston. $d$ is the smaller or trunk face of the piston separated from the upper or annular face $e$ by a cover or diaphragm $f$ in the cylinder, $g$ is the lower or working face of the piston. $h$ and $j$ are connections leading to a suitable operating valve $i$ connected to the train pipe $i^2$. $k$ and $m$ are the usual type of ball and release valves respectively, $n$, $n$ trunnions for supporting the apparatus and $o$ the piston rod for operating the brake levers $o^2$, $o^3$ and $o^4$ and brake shoe $o^5$. The train pipe is connected at $p$ in the usual way.

In operation when the operating valve $i$ is set in position for maximum braking power, the trunk face $d$ and the annular face $e$ are both in communication with the vacuum reservoir $a$ and the pressure in the train pipe $i^2$ acts on the working face $g$ of the piston thereby raising said piston and resulting in the brake $o^5$ being applied with the maximum braking power obtainable with the train pipe pressure. When the operating valve $i$ is set in position for partial braking power, the trunk face of the piston only is in communication with the vacuum reservoir and both the annular face and the working face are open to the train pipe whereby the piston $c$ is partially balanced, resulting in the application of a determined fraction only of the maximum braking power.

Figure 3:
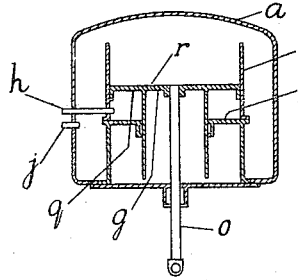
Figs. 3, 4 and 5 are diagrammatic sections of modified forms.

In Fig. 3 when the working face $g$ and the annular face $q$ are both placed in communication with the train pipe and the face $r$ with the vacuum reservoir, the pressure in the train pipe acts on the two faces $g$ and $q$ thus raising the piston and resulting in the maximum braking power being applied. When the working face $g$ only is in communication with the train pipe and the annular face $q$ and face $r$ both in communication with the vacuum reservoir, the train pipe pressure acts only on the face $g$ resulting in a determined fraction only of the maximum braking power being applied.

Figure 4:
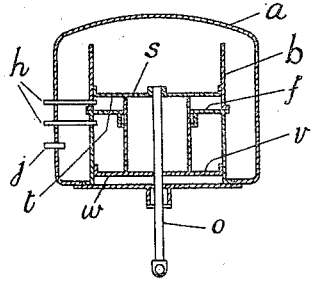

In Fig. 4 a double headed piston is used having four faces viz: upper face $s$ of upper piston head; lower or annular face $t$ of upper piston head; upper or annular face $v$ of lower piston head, and lower working face $w$ of lower piston head. For maximum braking power, the faces $s$ and $v$ are in communication with the vacuum reservoir and faces $t$ and $w$ in communication with the train pipe; the maximum braking power is therefore proportional to area of face $w$ plus the area of face $t$. For minimum braking power, faces $s$ and $t$ are in communication with the vacuum reservoir and faces $v$ and $w$ in communication with the train pipe; the minimum braking power is therefore proportional to area of face $w$ less the area of face $v$. For intermediate braking power, faces $s$, $t$ and $v$ are in communication with the vacuum reservoir and face $w$ in communication with the train pipe; the intermediate braking power is therefore proportional to the area of face $w$.

Figure 5:
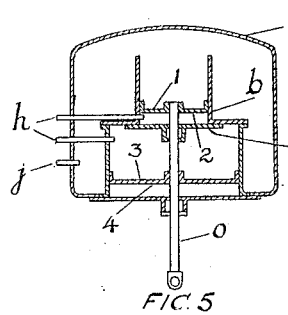

In Fig. 5 two pistons of different sizes are disposed in one cylinder and separated from each other by a diaphragm $x$, said pistons having four faces viz: upper face 1 of upper piston, lower face 2 of upper piston, upper face 3 of lower piston and lower face 4 of lower piston. For maximum braking power the faces 1 and 3 are in communication with the vacuum reservoir and faces 2 and 4 in communication with the train pipe; the maximum braking power is therefore proportional to the area of face 4 plus the area of face 2. For minimum braking power the face 1 is in communication with the vacuum reservoir and the faces 2, 3 and 4 in communication with the train pipe; the minimum braking power is therefore proportional to the area of face 2. For intermediate braking power the faces 1, 2 and 3 are in communication with the vacuum reservoir and face 4 in communication with the train pipe; the intermediate braking power is therefore proportional to the area of face 4.

Figure 6:
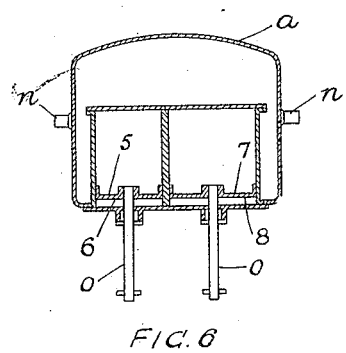
Figs. 6 and 7 are diagrammatic sectional elevation and plan respectively of a further modified form.

In Fig. 6 two separate pistons of different sizes are provided each disposed within a cylinder, said cylinders being placed side by side with their axes parallel. The smaller piston has an upper face 5 and a lower face 6 while the larger piston also has an upper face 7 and a lower face 8. For maximum braking power the faces 5 and 7 are in communication with the vacuum reservoir and faces 6 and 8 are in communication with the train pipe; the maximum braking power is therefore proportional to the areas of the two faces 6 and 8. For minimum braking power the face 5 is in communication with the vacuum reservoir while the faces 6, 7 and 8 are in communication with the train pipe; the minimum braking power is therefore proportional to the area of face 6. For intermediate braking power the face 7 is in communication with the vacuum reservoir while the faces 5, 6 and 8 are in communication with the train pipe; the intermediate braking power is therefore proportional to the area of face 8.

Further, I may if I so desire dispense with the internal cover or covers for the two cylinder barrels and balance the piston not required by the vacuum in the reservoir. In such cases maximum brake power would be obtained as just described, and intermediate and minimum powers obtained by connecting the surface 6 of the smaller piston with the vacuum reservoir, and the surface 8 of the larger piston with the train pipe, so that the resulting brake power would be proportional to the area of the larger piston, and for minimum power the surface 8 of the larger piston would be connected to the reservoir and the surface 6 of the smaller piston connected to the train pipe, in which case the brake power available would be proportional to the area of the smaller piston.

Figure 8:
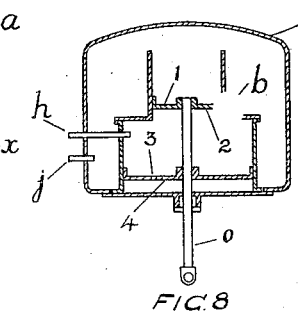
Figs. 8 to 12 are views showing further modified forms.

Fig. 8 is a modification of Fig. 5, the internal cover or diaphragm $x$ being dispensed with in which case maximum and minimum braking powers are obtainable. For maximum braking power the faces 1, 2 and 3 are in communication with the vacuum reservoir and the face 4 in communication with the train pipe; the maximum braking power is therefore proportional to the area of face 4. For minimum braking power the face 1 is in communication with the vacuum reservoir and the faces 2, 3 and 4 in communication with the train pipe; the minimum braking power is therefore proportional to the area of face 2.

Figure 9:
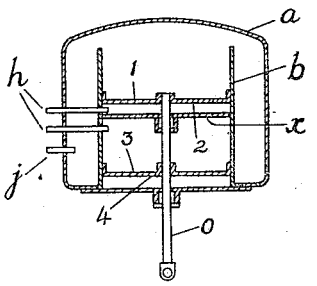

Fig. 9 is a further modification of Fig. 5 in that the two pistons are each of the same size resulting in maximum and minimum braking powers being obtained. For maximum braking power the faces 1 and 3 are in communication with the vacuum reservoir and faces 2 and 4 in communication with the train pipe; the maximum braking power is therefore proportional to the area of face 4 plus the area of face 2. For minimum braking power the faces 1, 2 and 3 are in communication with the vacuum reservoir and face 4 in communication with the train pipe; the minimum braking power is therefore proportional to the area of face 4.

Figures 10, 12:
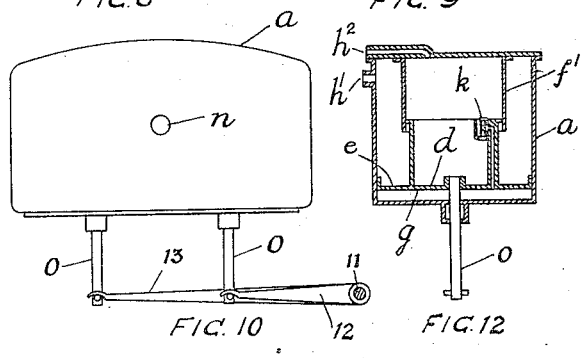
Figure 7:
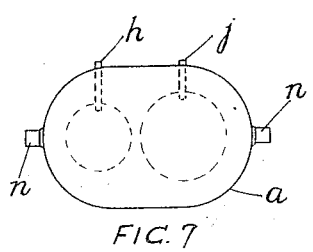
Figure 11:
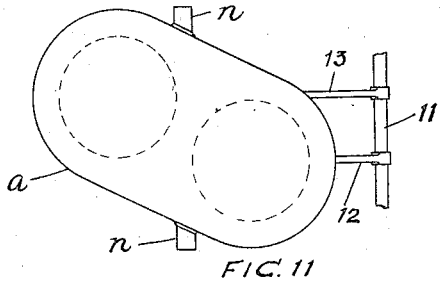

Figs. 10 and 11 show a modification of Fig. 6 the pistons being of equal size and their different axes so placed relatively to the brake shaft 11 that one piston rod is coupled to a shorter lever 12 than the other piston rod which is coupled to a longer lever 13.

These brake levers 12 and 13 are each mounted on the brake shaft 11 and so connected to the piston rods that on application of braking pressure only the piston moving in the cylinder will operate the brake shaft. Any proportional difference in braking power is therefore available for any given train pipe pressure conditions according to the difference in the lengths of the levers, the maximum braking power being obtained by the longer lever 13.

Fig. 12 is a further modification of Fig. 1, in that the internal cover or diaphragm $f$ is dispensed with and substituted by a secondary cylinder $f^1$ in the form of an inverted trunk bolted to the inside of the top cover of the cylinder and arranged concentric with the trunk extension mounted on the piston whereby said trunk extension can work an air tight fit inside the secondary cylinder. The usual ball valve $k$ is provided. Either the interior of the secondary cylinder or the annular face of the piston may be used to obtain minimum braking power, whichever is desired. If therefore the annular face $e$ is used, the train pipe would be connected at $h^1$ from the operating valve and the vacuum reservoir by a connection at $h^2$ also from the operating valve. The minimum braking power would therefore be proportional to the area of face $g$ less the area of face $e$. Alternatively if the interior of the secondary cylinder be used then the train pipe would be connected at $h^2$ and the vacuum reservoir at $h^1$ resulting in a minimum braking power proportional to the area of face $g$ less the area of face $d$. In this case the ball valve would be mounted on the larger piston. For maximum braking power the conditions would be precisely the same as in Fig. 1, that is, both faces $d$ and $e$ would be in communication with the vacuum reservoir.

It will be seen therefore that when the operating valves on a train of vehicles have each been set in position for the respective braking power required on each vehicle according to whether each vehicle is loaded, partially loaded or empty, each vehicle will be braked with its respective braking power required on any subsequent application of the brakes.

All the various forms of carrying out this invention may be adapted to work either in the vertical or horizontal position, and further I may employ operating or change valves of a type entirely hand operated or of a semi-automatic description, that is, those kinds which when definitely set by hand in a desired position would automatically assume the position previously occupied at a proper time.

Any of the methods which I have described as being suitable to produce three distinct degrees of brake power may, if desired, be applied where only two distinct powers are required, namely, a maximum and minimum, using either of the combinations of piston loads to obtain the results required.

I have described the means and apparatus for carrying my said invention into effect with reference to the type of brake wherein a vacuum is normally maintained in the train pipe, the brake being applied by the admission of air to the said train pipe, but it is obvious that the said invention may equally be applied to any form of fluid pressure brakes.

What I claim and desire to secure by Letters Patent is:

1. Fluid pressure braking apparatus for railway trains, comprising a brake cylinder on each vehicle, differential compartments within the said cylinder and corresponding piston faces acted upon by pressure admitted to the cylinder, mechanical connections from the pistons to the brake blocks, and means for admitting fluid pressure to the different compartments of the brake cylinder to apply at will a selected resultant braking pressure to the brake blocks of any vehicle of the train.

2. Fluid pressure braking apparatus for railway trains, comprising a brake cylinder on each vehicle, differential compartments within the said cylinder and corresponding piston faces acted upon by pressure admitted to the cylinder, mechanical connections from the pistons to the brake blocks, and means for admitting fluid pressure to the different compartments of the brake cylinder to apply at will either an increased or a reduced resultant braking pressure to the brake blocks of any vehicle of the train relatively to the braking pressure applied on any other vehicle of the train.

3. Fluid pressure braking apparatus for railway vehicles, comprising a housing, a plurality of piston faces located in said housing, mechanical connections from the pistons to the brake blocks, and means for selectively operating on said piston faces in a predetermined manner to provide at will a high or a relatively lower braking pressure on the brake blocks.

4. In fluid pressure braking apparatus for railway vehicles, the combination on each vehicle of differential pistons in a single housing, means for providing a summation of pressures on the said pistons acting in the same direction for obtaining a relatively high braking pressure on the brake blocks, and means for applying to the brake blocks a difference of the pressures acting on said pistons in opposite directions for obtaining a relatively lower braking pressure.

5. Fluid pressure braking apparatus for railway vehicles comprising brake blocks, means for operating said brake blocks, said means comprising a plurality of piston faces and devices for selectively operating on said piston faces in a predetermined manner by differential pressure, one piston face at least being in communication with the train pipe and one piston face at least being in communication with a vacuum.

6. Fluid pressure braking apparatus for railway vehicles comprising brake blocks, means for operating said brake blocks, said means comprising a plurality of piston faces and devices for selectively operating on said piston faces in a predetermined manner by differential pressure, one piston face at least being alternatively in communication with the train pipe and a vacuum.

7. Fluid pressure braking apparatus for railway vehicles comprising brake blocks, means for operating said brake blocks, said means comprising a plurality of piston faces operating through one piston rod and devices for selectively operating on said piston faces in a predetermined manner by differential pressure, one piston face at least being in communication with the train pipe.

8. Fluid pressure braking apparatus for railway vehicles comprising brake blocks, means for operating said brake blocks, said means comprising a plurality of piston faces operating through one piston rod and devices for selectively operating on said piston faces in a predetermined manner by differential pressure, one piston face at least being alternatively in communication with the train pipe and a vacuum.

In testimony whereof I have signed my name to this specification.

EDWARD CECIL POULTNEY.